April 7, 1964 M. R. BENWELL 3,128,101

AUTOMATIC RECORD CHANGING PHONOGRAPHS

Filed May 21, 1962 3 Sheets-Sheet 1

Inventor
M. R. Benwell
By [signature]
Attorneys

April 7, 1964 M. R. BENWELL 3,128,101

AUTOMATIC RECORD CHANGING PHONOGRAPHS

Filed May 21, 1962 3 Sheets-Sheet 2

Inventor
M. R. Benwell
By Holcombe, Wetherill & Brisebois
Attorneys

Inventor

By

Attorney

United States Patent Office 3,128,101
Patented Apr. 7, 1964

3,128,101
AUTOMATIC RECORD CHANGING PHONOGRAPHS

Michael Robert Benwell, Bowers Gifford, Basildon, England, assignor to The Magnavox Electronics Company Limited, Barking, Essex, England, a company of Great Britain Filed May 21, 1962, Ser. No. 196,223
Claims priority, application Great Britain July 28, 1961
3 Claims. (Cl. 274—10)

Figures 1, 2, 3:
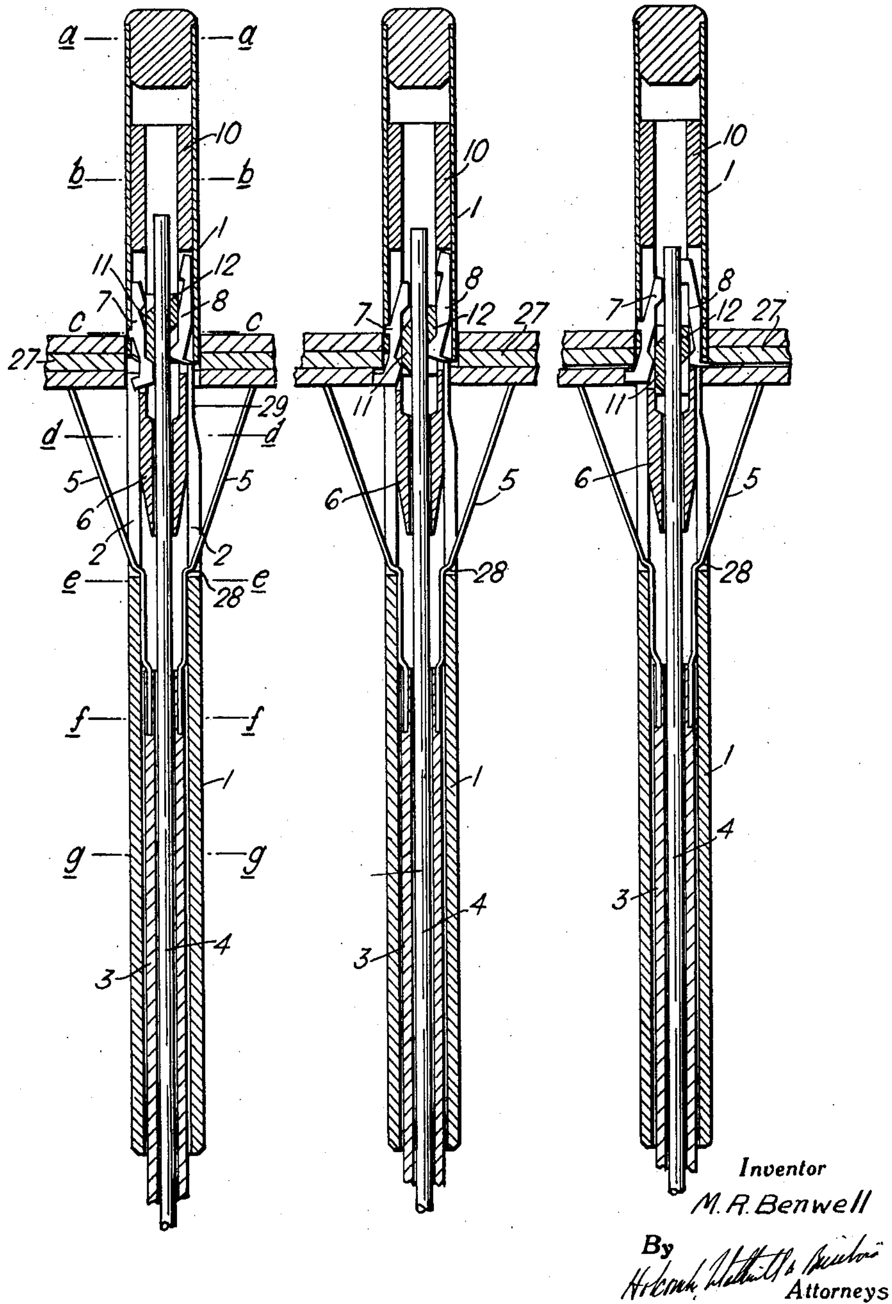
Figure 4:
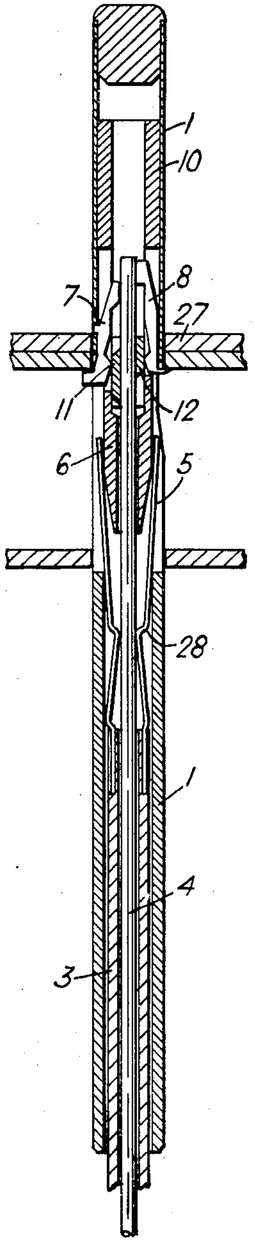
Figure 5:
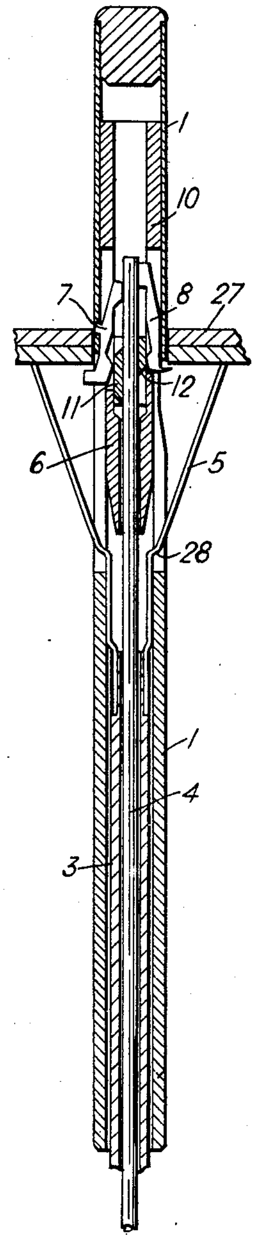
Figure 6:
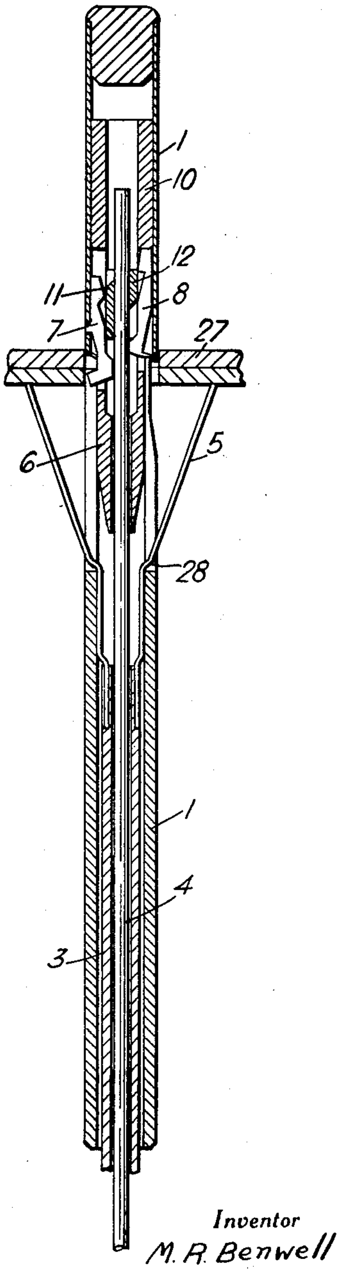
Figure 9:
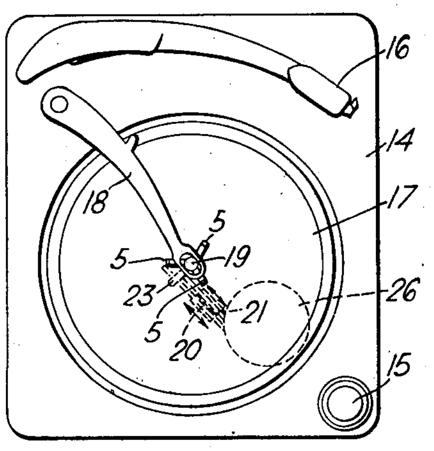
Figure 8:
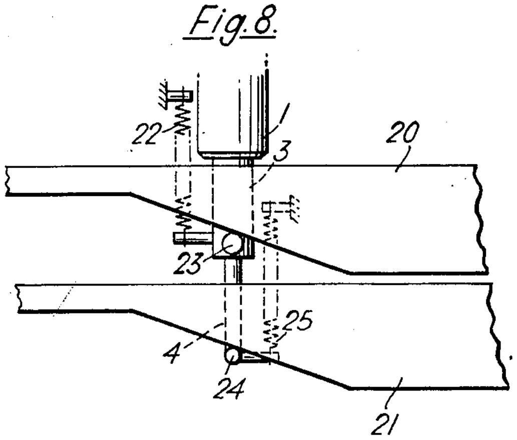
Figures 7A, 7B, 7C, 7D, 7E, 7F, 7G:
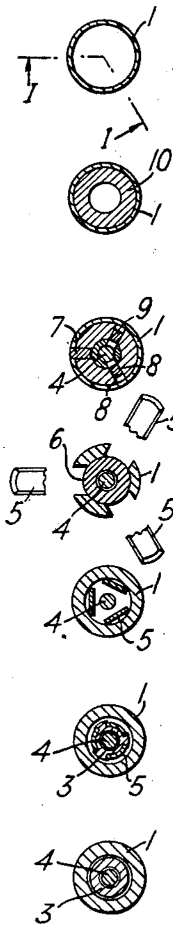

In automatic record changing phonographs, a stack of records is supported in a magazine and these records are fed one at a time on to the turntable of the phonograph where they are played.

One form of magazine on which the stack of records to be played is supported consists of a central spindle projecting upwards from the centre of the turntable. There is a support for the stack of records near the top of this spindle and the records are released from the bottom of the stack one at a time.

One particular form of a magazine spindle is commonly known as an umbrella spindle and it is this form of spindle with which the present invention is particularly concerned. In an umbrella spindle there is a primary support which consists of a number of fingers projecting from the periphery of the spindle rather like the supporting struts of an umbrella. Whilst one record is being played, the remainder of the stack of records is supported on this primary support. When the next lowermost record in the stack is to be dropped a secondary support comes into action and supports all the records in the stack except the lowermost. The primary support is then withdrawn within the spindle so that the lowermost record falls down the spindle and on to the turntable. The object of the present invention is to provide a spindle of this general type which is cheap and simple to mass-produce.

According to the present invention such a spindle comprises a tube having three or more slots in its wall spaced around its periphery, a number of fingers made of springy material having their outer ends projecting one through each of the slots, and having their inner ends attached to an operating sleeve which is axially slidable within the tube, the fingers together forming a primary support for a stack of records on the spindle, a number of lugs extending one through each of the slots to form a secondary support for all the records in the stack except the lowermost record when the primary support is withdrawn to allow the lowermost record to fall, an operating rod which is slidable within the sleeve independently of the movement of the sleeve, cams on the upper end of the operating rod in contact with cam follower surfaces on the lugs, and an operating mechanism for reciprocating the sleeve and the rod independently of each other once during each record change cycle in such a way that initially the rod is moved downwards and the lugs are caused by the cams to move out of the slots, one lug coming into engagement with the lowermost record in the stack and moving this record sideways, and this lug and the other lugs coming into position under the next lowest record in the stack after which the sleeve, and with it the fingers, are moved downwards so that all the records in the stack except the lowermost are supported on the lugs, continued downward movement of the sleeve withdrawing the fingers within the slots to allow the lowermost record to fall from the stack after which the sleeve is moved upwards to cause the fingers to project again and support the stack and rod is also then moved upwards and the cam causes the lugs to be withdrawn again within the slots.

Preferably there are three slots in the periphery of the tube arranged at 120 degrees angular intervals. From these slots three fingers and three lugs project. These three fingers and lugs provide a stable 3-point support for the records and any further fingers or lugs would not add to the stability and only make the mechanism more complicated. With this number of slots there is preferably one lug which is shaped so that it will engage with the edge of the hole in the centre of the record and push the record sideways and the other two lugs projecting from the other two slots having sharp knife edges which enable them to engage between the lowermost record in the stack and the next record upwards. Even when the lugs are differently shaped in this way, however, the entry of the lugs which form the secondary support underneath the one but lowest record in the stack can be facilitated by causing the first lug, which pushes the lowermost record sideways, to project first and for the other two lugs only to project after the first lug has finished its movement. This can be arranged quite simply with the spindle in accordance with the present invention by offsetting in a vertical direction the cam which operates the first lug from the two cams which operate the other two lugs. Thus, when the operating rod is moved downwards, the first cam comes into operation first of all and causes the first lug to project and move the lowermost record in the stack sideways and then continued movement of the operating lug downwards causes the remaining two lugs to project and again come between the lowermost record in the stack and the next record. It is only then after all three lugs have moved into their projecting positions that the sleeve is moved downwards to cause the spring fingers to be withdrawn within the tube.

One example of a phonograph having a spindle constructed in accordance with the present invention is illustrated in the accompanying drawings, in which:

FIGURES I to VI are longitudinal sections of the spindle as seen in the direction of the arrows on the line I—I in FIGURE VII*a*, and showing successive steps in the operating cycle of the spindle;

FIGURES VII*a* to VII*g* are cross sections of the spindle as seen in the direction of the arrows on the lines *a—a* to *g—g* respectively in FIGURE I;

FIGURE VIII is a diagrammatic side view of the mechanism for raising and lowering parts of the spindle; and, FIGURE IX is a plan view of a phonograph.

The spindle is formed by a metal tube 1 having three longitudinal slots 2 through its walls at 120° intervals, the wall thickness above the slots being less than below the slots. A tubular sleeve 3 is a free sliding fit within the lower thick-walled part of the tube 1 and an operating rod 4 slides in the sleeve 3. Three flat resilient metal fingers 5 are connected at 120° intervals to the top of the sleeve 3 and their free ends which are inclined outwards from the vertical by approximately 20°, extend through the slots 2. The operating rod 4 extends upwards between the fingers 5 through a tubular core 6 which has a conical outer surface. Three lugs 7, 8 and 9 are situated at 120° intervals in the annular space between the tube 1 and the operating rod 4. These lugs are vertically movable between the top of the core 6 and the bottom of a further sleeve 10 which is fixed in the top of the tube 1.

Projecting from the periphery of the upper end of the operating rod 4 are three equally spaced cams 11, 12 and 13 which engage sloping cam follower surfaces on the three lugs 7, 8 and 9 respectively. The cam 13 which is not in fact visible in the drawings is similar to the cam 12. Each of the lugs 7, 8 and 9 has a short outwardly projecting arm at its lower end and the lugs 7, 8 and 9 are rocked by vertical movement of the cams 11, 12 and 13 so that these arms either project through the tops of the slots 2 or are withdrawn within the tube. The arm of the lug 7 has a blunt end and a thickness measured in a vertical direction approximately equal to that of a standard disc record and the other two lugs 8 and 9 have thin arms, the tips of which taper to a knife edge.

The bottoms of both the operating sleeve 3 and the operating rod 4 project from the bottom of the tube 1 and are connected to an operating mechanism which is controlled by the change cycle mechanism of the automatic phonograph illustrated in FIGURE IX. The phonograph comprises a spring loaded platform 14 which carries a combined on-off switch and control knob 15, a pick up arm 16, a turntable 17 and a stabilising arm 18 for maintaining the records horizontally on the spindle which is shown at 19. As shown in more detail in FIGURE VIII, the mechanism for raising and lowering the sleeve 3 and the rod 4 consists of two horizontally movable inclined cam surfaces 20 and 21. The sleeve 3 is urged upwards by a spring 22 and carries a side arm 23 which rests against the underside of the cam surface 20. When the cam surface 20 is moved to the left in FIGURE VIII, the arm 23 and the sleeve 3 are forced downwards against the action of the spring 22. When the cam surface 20 is subsequently retracted to the right, the sleeve 3 is raised again. The rod 4 passes through the bottom of the sleeve 3 and a slot in the cam surface 20 and has another side arm 24 which rests against the underside of the cam surface 21. The rod 4 is raised and lowered as the cam surface 21 is moved and under the action of a spring 25 similarly to the sleeve 3. The cam surfaces 20 and 21 are moved backwards and forwards by a control disc 26 having cam grooves in its surface. The disc 26 rotates through 360° once in each record change cycle and operates in a conventional manner, for example, as described in British specification No. 805,964.

In between the cycles of operation when the parts of the spindle are in their static positions in which a stack of records 27 is supported on the fingers 5, as shown in FIGURE 1, both the sleeve 3 and the operating rod 4 are in their raised positions and the inclined parts of the fingers project outwards from the slots and support the records on their tips. The load of the records is taken on the shoulders 28 of the fingers 5 which engage with the bottoms of the slots 2. In this position, the arms of all three lugs 7, 8 and 9 are withdrawn within the tube 1.

To initiate a record change cycle the rod 4 is first of all moved downwards so that the cam 11 comes into engagement with the inclined surface on the lug 7 and this causes the arm of this lug to extend from the slot 2. The blunt nose of this arm engages the wall of the central hole in the lowermost record in the stack 27 and pushes this record to the left as seen in FIGURE II. To enable the record to move in this way, there is a recess 29, on the side of the tube 1 remote from the lug 7, into which the part of the record surrounding the central hole is moved. The top surface of the arm of the lug 7 engages under the bottom but one record in the stack 27.

Further downward movement of the operating rod 4 causes the cams 12 and 13 to come into engagement with inclined surfaces on the lugs 8 and 9 and this causes the knife edge arms of these lugs to project from the other slots 2 and between the bottom and bottom but one record in the stack 27 as shown in FIGURE III.

The operating rod 4 then remains in this lowered position and downward movement of the operating sleeve 3 commences. A very slight initial movement causes the whole weight of all the records but the lowermost to be taken on the top surfaces of the projecting arms of the lugs 7, 8 and 9. Continued downward movement of the sleeve 3 lowers the lowermost record on the fingers 5 and also causes the fingers 5 to be bent inwards by engagement with their outside surfaces of the lower edges of the slots 2 in the tube 1. As the downward movement of the sleeve 3 continues, the three fingers 5 are completely withdrawn into the tube 1 so that the lowermost record is released and falls down the spindle on to the turntable 17 below as shown in FIGURE IV. As soon as this occurs, the sleeve 3 is moved up again and the inclined free ends of the fingers 5 protrude again from the slots 2 and spread outwards owing to their own natural resilience. The fingers 5 engage what is now the lowermost record in the stack 27 and when they reach their uppermost position, the stack 27 of records is lifted from the arms of the three lugs 7, 8 and 9, as shown in FIGURE V. At this stage, the operating rod 4 is moved upwards again so that the three cams 11, 12 and 13 come into engagement with upper cam follow surfaces on the lugs 7, 8 and 9 respectively. This causes the lugs 7, 8 and 9 to rock back to a position in which their arms are all withdrawn within the tube 1. As soon as this has happened, the sleeve 3 moves downwards again slightly so that the shoulders 28 on the fingers 5 once more rest on the bottom edges of the slots 2. This completes the operating cycle.

I claim:

1. In an automatic record-changing phonograph having a mechanism which brings about a record change cycle the improvement which comprises a magazine spindle comprising a tube, wall portions of said tube defining at least three slots spaced around the periphery of said tube, an operating sleeve axially slidable within said tube, at least three fingers having inner and outer ends, means fixing said inner ends to said sleeve and said outer ends projecting one from each of said slots, said fingers together forming a primary support for a stack of records on the spindle, a plurality of lugs extending one through each of the sots to form a secondary support for all the records in said stack except the lowermost record when said primary support is withdrawn to allow the lowermost record to fall, an operating rod which is slidable within said sleeve independently of the movement of said sleeve, cams on the upper end of said operating rod in contact with cam follower surfaces on said lugs, and an operating mechanism for reciprocating said sleeve and said rod independently of each other once during each record change cycle in such a way that initially said rod is moved downwards and said lugs are caused by said cams to move out of said slots, one lug coming into engagement with the lowermost record in the stack and moving this record sideways, and this lug and the other lugs coming into position under the next lowest record in the stack after which said said sleeve, and with it said fingers, are moved downwards so that all the records in the stack except the lowermost are supported on said lugs, continued downward movement of said sleeve withdrawing said fingers within said slots to allow the lowermost record to fall from the stack after which said sleeve is moved upwards to cause said fingers to project again and support the stack and said rod is also then moved upwards and said cams cause said lugs to be withdrawn again within said slots.

2. A phonograph according to claim 1, in which there are three slots in the periphery of the tube at 120 degrees angular intervals and one finger and one lug project from each slot, one lug being shaped so that it will engage with the edge of the hole in the centre of the record and push the record sideways as it is caused to project from its slot and the other two lugs having knife edges which enables them to engage between the lowermost record and the next record upwards in the stack.

3. A phonograph according to claim 2, in which the cam which operates the one lug is vertically offset from the cams which operate the other two lugs so that in operation the one lug is caused to project from its slots before the other two lugs are caused to project from their slots.

References Cited in the file of this patent

UNITED STATES PATENTS 2,615,720 Miller ---------------- Oct. 28, 1952

FOREIGN PATENTS 637,921 Great Britain ---------- May 31, 1950